United States Patent [19]

Holman

[11] Patent Number: 5,544,540

[45] Date of Patent: Aug. 13, 1996

[54] GEROTOR PUMP FOR VEHICLE TRANSMISSION LUBRICATION SYSTEM

[75] Inventor: James L. Holman, Wauseon, Ohio

[73] Assignee: Dana Corporation, Toledo, Ohio

[21] Appl. No.: 365,770

[22] Filed: Dec. 29, 1994

[51] Int. Cl.[6] .............................. F16H 57/04; F16N 7/38; F16C 1/10

[52] U.S. Cl. ........................ 74/467; 184/6.12; 418/171

[58] Field of Search ........................... 74/467; 184/6.12; 418/170, 171

[56] References Cited

U.S. PATENT DOCUMENTS

| 3,407,741 | 10/1968 | Weber et al. | 184/6.12 X |
|---|---|---|---|
| 4,185,717 | 1/1980 | Ford, Jr. et al. | 418/171 X |
| 4,329,887 | 5/1982 | Kawamoto | 74/467 |

FOREIGN PATENT DOCUMENTS

| 0076033 | 4/1983 | European Pat. Off. . |
|---|---|---|
| 0174734 | 3/1986 | European Pat. Off. . |
| 2020361 | 11/1979 | United Kingdom . |

OTHER PUBLICATIONS

International Warranty Coverage brochure (undated) (prior Dec. 29, 1994).
Eaton Fuller RTLO 16618 Series Illustrated Parts List (Sep. 1992).
Eaton Truck Components Bulletin Trans IB-212 (Dec. 1993).
T. Roeber sketch dated Nov. 10, 1993.

*Primary Examiner*—Allan D. Herrmann
*Attorney, Agent, or Firm*—MacMillan, Sobanski & Todd

[57] ABSTRACT

An improved system for lubricating the gears and bearings in a vehicle transmission is provided including an improved gerotor pump mounted on the interior of the transmission housing. The gerotor pump includes an inner pump element and an outer pump element. One end of the outer element is provided with a radially inwardly extending portion which extends over the end of the inner element. This end of the outer element also includes a radially outwardly extending toothed portion which meshes with and is driven by one of the countershaft gears of the transmission. The inner and outer elements are both piloted on a flanged nut and pilot pin assembly which is secured to an interior wall of the transmission housing by a threaded stud. The gerotor pump of the invention thus eliminates the need for a pump housing and permits the use of a higher displacement set of gerotor elements in a given amount of space. In addition, by driving the outer element rather than the inner element, a higher pump speed and increased pump flow are achieved.

22 Claims, 3 Drawing Sheets

5,544,540

GEROTOR PUMP FOR VEHICLE TRANSMISSION LUBRICATION SYSTEM

BACKGROUND OF THE INVENTION

This invention relates in general to transmission lubrication systems and in particular to an improved gerotor pump for use in the lubrication system of a vehicle transmission.

In most vehicles, a transmission is provided in the drive train between the engine and the driven wheels. As is well known, the transmission includes a housing containing an input shaft, an output shaft, and a plurality of meshing gears which are selectively connected between the input shaft and the output shaft. The meshing gears contained within the transmission housing are of varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, this gear ratio selection is accomplished by moving one or more control members provided within the transmission. Movement of the control member causes certain ones of the meshing gears to be connected between the input shaft and the output shaft so as to provide the desired gear ratio therebetween. In a manual transmission, movement of the control member is accomplished by manual exertion of the vehicle driver, such as through a shift lever. In an automatic transmission, movement of the control member is accomplished by a pnemnatic or hydraulic actuator in response to predetermined operating conditions.

In both manual and automatic transmissions, it is known to provide lubricant within the transmission for minimizing the adverse effects of friction caused by the meshing gears contained therein. In the past, the lower portion of the housing of the transmission functioned as a sump for the lubricant. Portions of the meshing gears of the transmission were partially submerged in the lubricant. Thus, when such gears were rotated during use, the lubricant was carried thereon or splashed into the meshing teeth thereof so as to provide lubrication.

Although this sump type of lubrication system has functioned successfully in the past, it has been found to have several drawbacks. First, a certain amount of clearance space must be provided between the lower portions of the meshing gears and the housing of the transmission. Consequently, a relatively large amount of lubricant is required to fill the sump of the transmission housing to a sufficiently high level to insure that all of the meshing gears are at least partially submerged therein. This relatively large amount of lubricant adds unnecessary weight and expense to the transmission.

Second, transmissions are often operated at an angle which is inclined relative to the horizontal. In some instances, the transmission is installed within the vehicle at an angle which is inclined relative to the horizontal. In other instances, the transmission is installed horizontally within to the vehicle, but the vehicle is operated on an inclined surface, such as when climbing a hill. In either event, because gravity maintains the level of the lubricant horizontal, some of the meshing gears in the transmission are often deeply submerged in the lubricant during operation while others are only partially submerged. The continuous rotation of the deeply submerged gears causes unnecessary churning of the lubricant in the sump, which results in a loss of efficiency and increased lubricant temperature.

The problem of increased lubricant temperature has been addressed in the past by mounting a pump on the exterior of the transmission. The pump is connected to a rotating shaft contained within the transmission so as to be driven thereby. The pump circulates the lubricant out of the sump, through a heat exchanger typically provided at the front of the vehicle, and back into the sump. Unfortunately, this relatively lengthy and complicated fluid path also resulted in loss of efficiency.

To avoid this drawback, a pump has been mounted within the transmission housing to circulate the lubricant. One type of pump which has been mounted within the transmission is a gerotor pump. Gerotor pumps are positive displacement pumps having inner and outer rotors or elements supported within a pump housing. The inner element has one less tooth than the outer element. The inner and outer elements have conjugately-generated tooth profiles to maintain continuous fluid tight contact during operation. As the gerotor revolves, fluid is drawn into the enlarging chamber to a maximum volume equal to that of the missing tooth on the inner element. The fluid is forced out as the teeth mesh, decreasing the chamber volume. Modem vehicle transmissions are becoming increasingly smaller in physical size, and the space available within the transmission case for these pumps is becoming increasingly limited. Thus, while the conventional gerotor pump is efficient and compact relative to other types of pumps, it would be desirable to provide an improved structure for a gerotor pump for a transmission lubrication system which is simple in construction, compact in size and efficient.

SUMMARY OF THE INVENTION

This invention relates to an improved system for lubricating the gears and bearings in a vehicle transmission. The lubricant distribution system includes an improved gerotor pump which is mounted on the interior of the transmission housing and is connected to a rotatably driven shaft contained therein so as to be rotatably driven. When so operated, the pump draws lubricant from a sump defined in the lower portion of the transmission housing. The lubricant from the pump is delivered through a fluid conduit to an internal lubricant conduit having a plurality of apertures formed therein. The apertures are located directly above the region where the various gears contained within the transmission mesh. Lubricant sprayed from the apertures falls from the meshing gears under the influence of gravity and is collected in the sump defined in the lower portion of the transmission housing so as to be recirculated.

The gerotor pump of the invention includes an inner pump element and an outer pump element. One end of the outer element is provided with a radially inwardly extending portion which extends over the end of the inner element. This end of the outer element also includes a radially outwardly extending toothed portion which meshes with and is driven by one of the countershaft gears of the transmission. The inner and outer elements are both piloted on a flanged nut and pilot pin assembly which is secured to an interior wall of the transmission housing by a threaded stud. The outer element is piloted on the ranged nut, which includes a centrally located through hole in which the stud is threadedly secured. The inner element is piloted on the pilot pin, which is provided with an offset through hole in which the threaded stud is received. The stud is threadedly secured to the interior wall of the housing. Pump inlet and outlet passages are preferably provided by U-shaped channels cast into the interior wall of the housing. These channels are closed off by a flat plate, such as a bearing retainer plate, to define lubricant passageways. The gerotor pump of the invention thus eliminates the need for a pump housing and permits the use of a higher displacement set of gerotor elements in a given amount of space. In addition, by driving the outer element rather than the inner element, a higher pump speed and increased pump flow are achieved.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
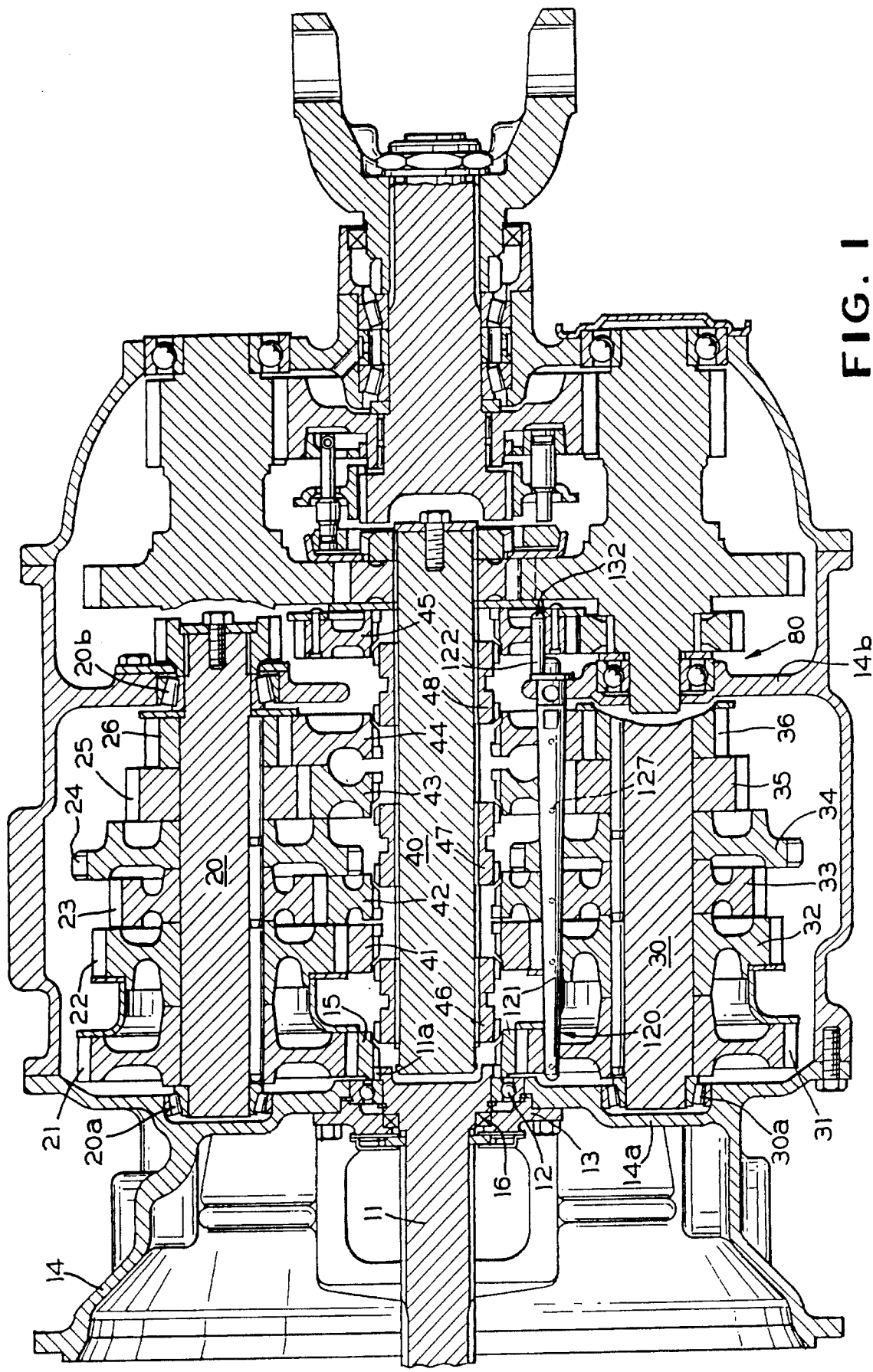
FIG. 1 is a top view, partially in section, of a vehicle transmission including a lubrication system in accordance with this invention.

Referring now to the drawings, there is illustrated in FIG. 1 a twin countershaft compound transmission, indicated generally at 10. The transmission 10 is generally conventional in the art and is intended to be representative of any known vehicle transmission structure, either manually or automatically shifted. As a result, only a brief overview of the structure and operation of the illustrated transmission 10 is necessary for a complete understanding of the lubricant distribution system of this invention. The transmission 10 includes an input shaft 11 which is adapted to be rotatably driven, such as by a conventional internal combustion or diesel engine (not shown). If desired, a conventional clutch (not shown) may be connected between the vehicle engine and the input shaft 11 of the transmission 10. The input shaft 11 is supported for rotation by a bearing 12 mounted in an opening formed through a bearing cap 13 secured to a forward wall 14a of a case or housing 14 for the transmission 10. The axial inner end of the input shaft 11 is formed having an integral toothed gear portion 11a which meshes with a plurality of radially inwardly extending teeth formed on an annular input drive gear 15. A seal 16 is provided about the input shaft 11 for preventing lubricant contained within the transmission 10 from escaping, as will be described in detail below.

Within the transmission housing 14, a first countershaft 20 is rotatably supported on a pair of tapered roller bearings 20a and 20b. The forward tapered roller bearing 20a is received within a recess formed in the inner surface of the forward wall 14a of the transmission housing 14. The rearward tapered roller bearing 20b is received within a recess formed in the inner surface of an interior wall 14b of the transmission housing 14. A plurality of gears 21, 22, 23, 24, 25, and 26 are splined onto the first countershaft 20 for rotation therewith. The input drive gear 15 further includes a plurality of radially outwardly extending teeth which mesh with a corresponding plurality of teeth formed on the first one 21 one of the first countershaft gears. Thus, when the input shaft 11 is rotated, the input drive gear 15, the first countershaft 20, and all of the first countershaft gears 21 through 26 are rotated therewith. Similarly, a second countershaft 30 is rotatably supported within the transmission housing 14 on a pair of tapered roller bearings 30a (only one is illustrated). A plurality of gears 31, 32, 33, 34, 35, and 36 are splined onto the second countershaft 30 for rotation therewith. The radially outwardly extending teeth of the input drive gear 15 also mesh with a corresponding plurality of teeth formed on the first one 31 of the second countershaft gears. Thus, when the input shaft 11 is rotated, the input drive gear 15, the second countershaft 30, and all of the second countershaft gears 31 through 36 are also rotated therewith.

A splined main shaft 40 is also provided within the transmission housing 14. A plurality of annular main shaft gears 41, 42, 43, and 44 are disposed co-axially about the main shaft 40. The first main shaft gear 41 meshes with both the second one 22 of the first countershaft gears and the second one 32 of the second countershaft gears. Similarly, the remaining main shaft gears 42, 43, 44 mesh with the corresponding ones of the first countershaft gears 23, 25, 26 and the second countershaft gears 33, 35, and 36. An annular output drive gear 45 is also disposed co-axially about the main shaft 40.

A plurality of hollow cylindrical clutch collars 46, 47, and 48 are splined onto the main shaft 40 for rotation therewith. Each of the clutch collars 46, 47, and 48 is illustrated in FIG. 1 in a neutral or non-gear engaging position. However, each of the clutch collars 46, 47, and 48 is axially movable relative to the main shaft 40 between first and second gear engaging positions. For example, the first clutch collar 46 may be moved axially forwardly (toward the left when viewing FIG. 1) so as to connect the input drive gear 15 to the main shaft 40 for direct drive operation. The first clutch collar 46 may alternatively be moved axially rearwardly (toward the right when viewing FIG. 1) so as to connect the first main shaft gear 41 to the main shaft 40 for gear reduction operation. The other clutch collars 47 and 48 may be moved in a similar way to control the operation of the transmission 10 in a known manner.

As is well known, axial movement of the clutch collars 46, 47, and 48 is accomplished by respective shift forks (not shown) which engage each of the clutch collars 46, 47, and 48. The shift forks are mounted on respective shift rails (not shown) for axial movement therewith forwardly and rearwardly. Typically, a shift tower containing a manually operable shift lever (not shown) is provided for selecting one of the shift rails for movement and for shifting the selected shift rail forwardly or rearwardly as desired. It will be appreciated, however, that such selecting and shifting actions may alternatively be performed by any known automatic or automated manual apparatus.

As mentioned above, the illustrated transmission 10 is a compound transmission. The components of the illustrated transmission 10 thus far described constitute the main section of the transmission, which provides a predetermined number of speed reduction gear ratios. The illustrated transmission 10 further includes a conventional auxiliary section, which is located rearwardly (toward the right when viewing FIG. 1) of the main section and is separated therefrom by an interior wall 14b of the transmission housing 14. The auxiliary section also provides a predetermined number of speed reduction gear ratios in a known manner. The total number of speed reduction gear ratios available from the transmission 10 as a whole, therefore, is equal to the product of the gear ratios available from the main section and the gear ratios available from the auxiliary section. Although the illustrated transmission 10 is a compound transmission, it will be appreciated that any conventional single stage transmission may be used with the lubricant distribution system of this invention. The structure of the transmission thus far described is conventional in the art.

Figure 2:
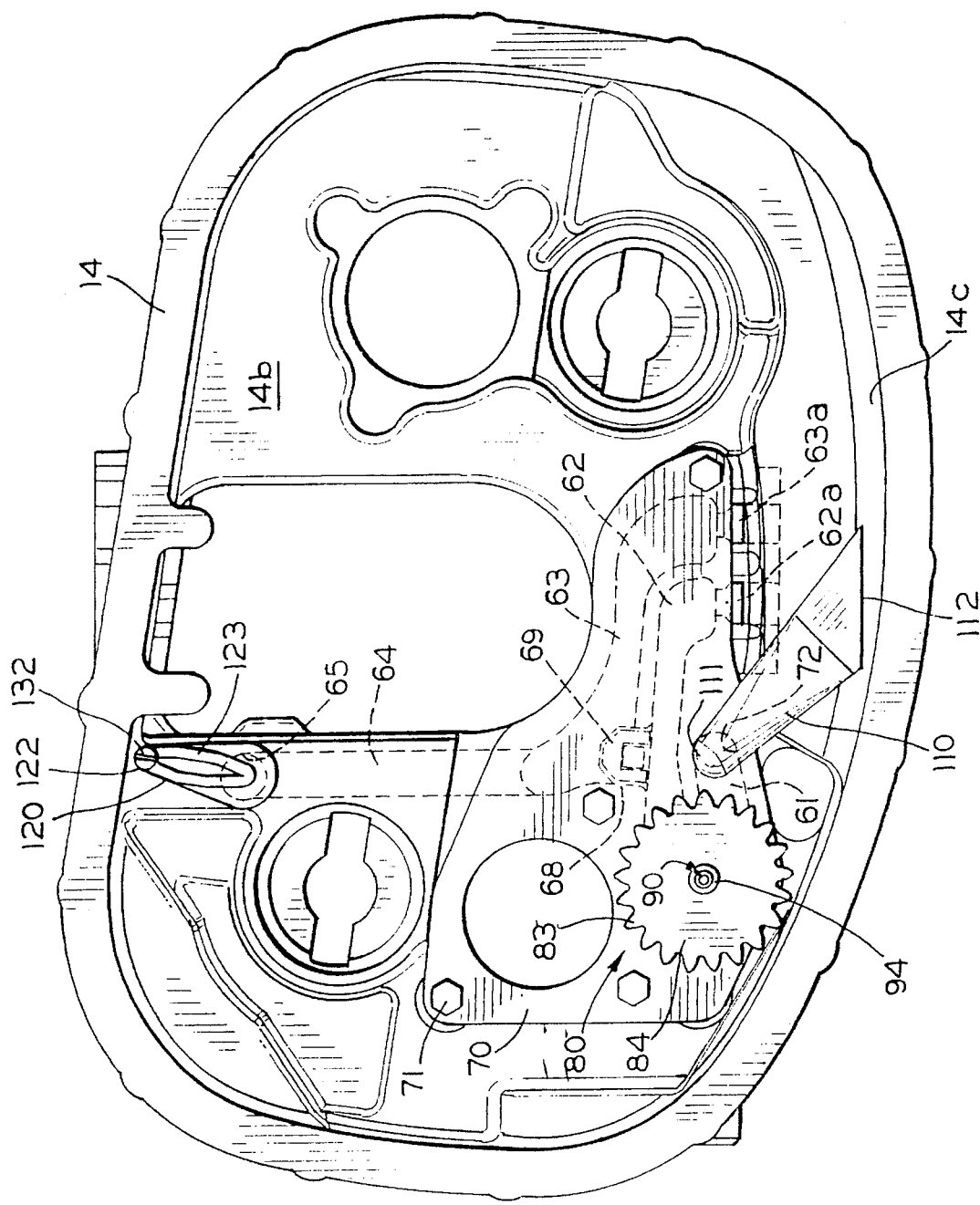
FIG. 2 is an end elevational view of a portion of the transmission and the lubricant distribution system with the gerotor pump of this invention.
Figure 3:
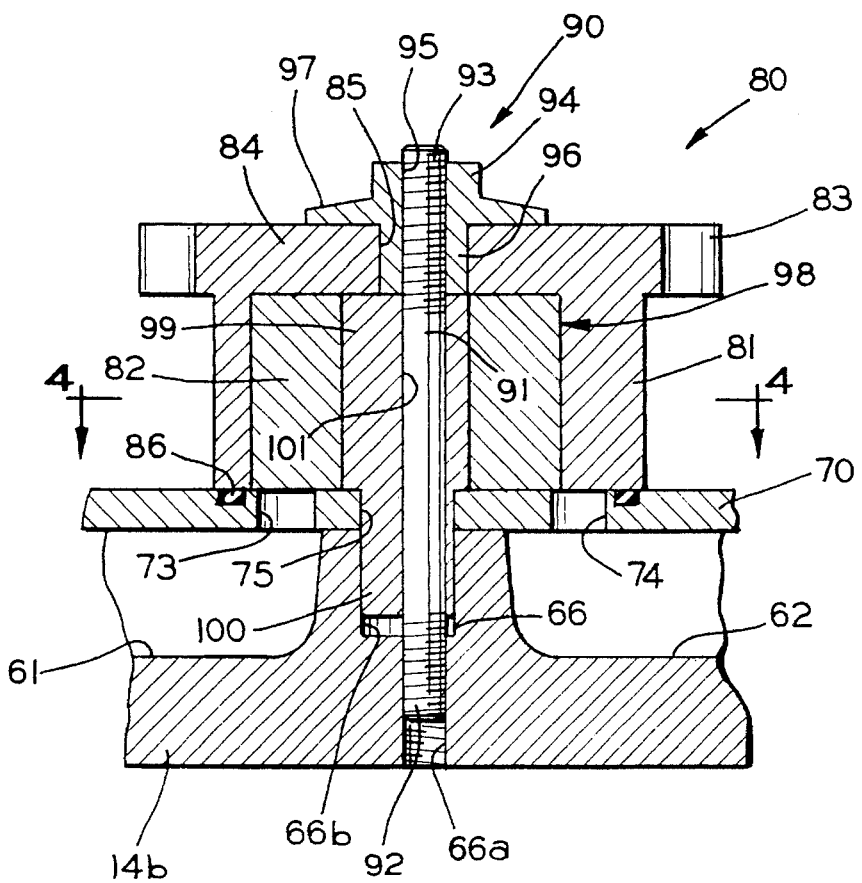
FIG. 3 is a sectional view of the gerotor pump illustrated in FIG. 2.
Figure 4:
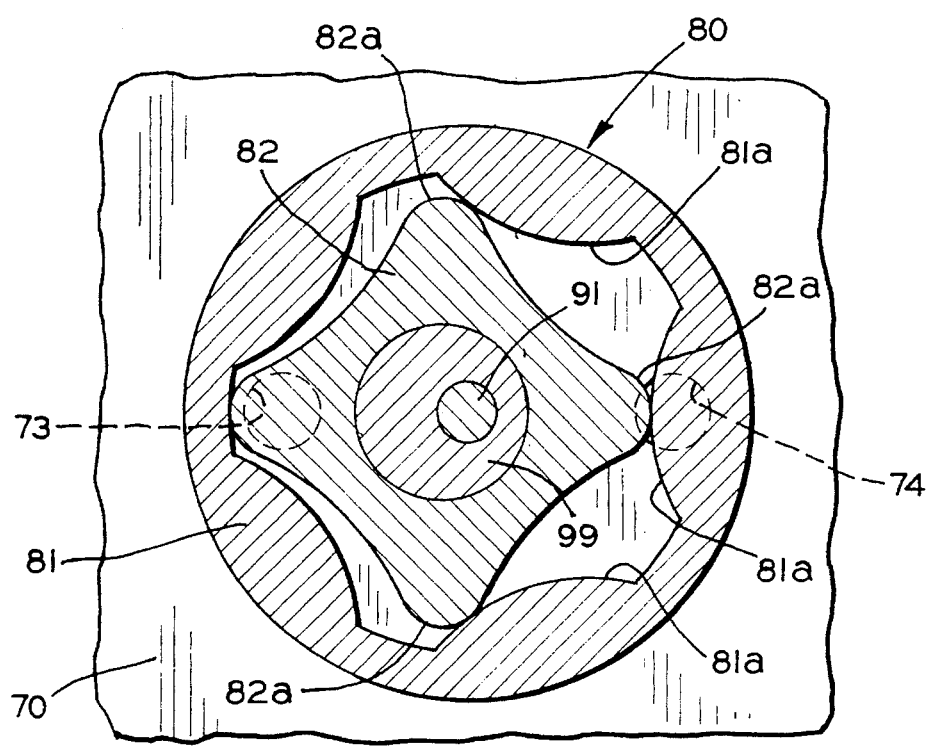
FIG. 4 is a sectional elevational view taken along line 3—3 of FIG. 3.

The transmission 10 further includes a system for distributing lubricant to the various meshing gears contained therein. Referring to FIGS. 2 through 4, the lubricant distribution system includes a plurality of channels 61, 62, and 63 which are formed in the lower portion of the interior wall 14b of the transmission housing 14. Each of the channels 61, 62 and 63 is preferably cast directly in the interior wall 14b of the transmission housing 14 and is formed having a generally U-shaped cross section. As will be explained in greater detail below, the first channel 61 functions as an inlet passageway for supplying lubricant to a pump for the lubricant distribution system. The second channel 62 functions as a first portion of an outlet passageway from the pump of the lubricant distribution system, while the third channel 63 functions as a second portion of such outlet passageway.

As shown in FIG. 2, the second channel 62 communicates with a port 62a formed through a bottom wall of the transmission housing 14. Similarly, the third channel 63 communicates with a port 63a formed through the bottom wall of the transmission housing 14. The ports 62a and 63a are adapted to receive conventional fluid tight fittings therein which facilitate the connection of respective fluid conduits (not shown) thereto. The fluid conduits may be used to circulate lubricant into and out of the transmission 10 if desired. For example, the fluid conduits may communicate with one or more external devices for conditioning the lubricant as it flows from the pump to the gears of the transmission 10. The lubricant may flow out of the port 62a, through a fluid conduit to an external oil filter or an external heat exchanger (neither of which is illustrated), as examples. Then, the lubricant may be returned through a fluid conduit and the port 63a to the transmission 10.

An internal passageway 64 is formed within the interior wall 14b of the transmission housing 14. The lower end of the internal passageway 64 communicates with the upper end of the third channel 63. The upper end of the internal passageway 64 communicates with an axially extending bore 65 formed through the upper portion of the interior wall 14b of the transmission housing 14. Thus, the internal passageway 64 provides fluid communication between the third channel 63 and the bore 65. The purpose for this fluid communication will be explained below. Also, as best seen in FIG. 3, a bore 66 is formed in the interior wall 14b of the transmission housing 14 between the first passageway 61 and the second passageway 62. The bore 66 includes a smaller diameter threaded portion 66a and an enlarged diameter portion 66b. The purpose for the bore 66 will also be explained below.

A bypass channel 68 is preferably formed in the interior wall 14b of the transmission housing 14 extending between the second channel 62 and the third channel 63. Within the bypass channel 68, a conventional pressure relief valve 69 is disposed. The pressure relief valve 69 is normally closed, thus preventing any lubricant from flowing from the second channel 62 through the bypass channel 68 to the third channel 63. However, when the pressure of the lubricant in the second channel 62 exceeds a predetermined value, the pressure relief valve 69 will open. When this occurs, lubricant flows directly from the second channel 62 through the bypass channel 68 to the third channel 63. When this occurs, the lubricant bypasses the ports 62a and 63a and any external devices for conditioning the lubricant which may be connected thereto.

The bypass channel 68 and the pressure relief valve 69 are provided to maintain the flow of lubricant through the lubricant distribution system even when such flow may be difficult. For example, under certain low temperature conditions, the lubricant may be relatively heavy and viscous, making it difficult to pump through the conduits 62b and 63b to the external devices for conditioning the lubricant. In other instances, a blockage may occur which reduces or prevents the flow of lubricant to or from the external devices for conditioning the lubricant. Under such circumstances, the pressure of the lubricant in the second channel 62 will increase as a result of the resistance to flow, causing the pressure relief valve 69 to open. Consequently, lubricant can temporarily flow directly from the second channel 62 to the third channel 63, bypassing the fluid conduits 62b and 63b and any external devices for conditioning the lubricant connected thereto. When the temperature of the lubricant subsequently rises and becomes relatively light and non-viscous, or when the blockage is removed, the pressure relief valve 69 will close, thus preventing the direct flow of lubricant from the second channel 62 to the third channel 63 through the bypass passageway 68.

A bearing retainer plate, indicated generally at 70, is provided within the transmission housing 14. The bearing retainer plate 70 is provided to retain the rearward tapered roller bearing of the second countershaft 30 within its associated recess formed through the interior wall 14b of the transmission housing 14. To accomplish this, the bearing retainer plate 70 is formed of a flat metal stamping and is secured to the interior wall 14b of the transmission housing 14 by a plurality of threaded fasteners 71. A first circular opening 72 is formed through the bearing retainer plate 70. When the bearing retainer plate 70 is installed, the first circular opening 72 is aligned over and provides communication with one end of the first channel 61 formed in the interior wall 14b. Inlet and outlet ports 73 and 74, respectively, are also formed through the bearing retainer plate 70. When the beating plate 70 is installed, the inlet port 73 is aligned over and provides communication with the opposite end of the first channel 61. Similarly, when the bearing plate 70 is installed, the outlet port 74 is aligned over and provides communication with one end of the second channel 62. Lastly, a second circular opening 75 is also formed through the bearing retainer plate 70. When the bearing plate 70 is installed, the second circular opening 75 is aligned over the bore 66 formed in the interior wall 14b. The retainer plate 70 covers the remaining portions of each of the open channels 61, 62, 63 and 68, thereby forming respective fluid tight passageways.

The lubricant distribution system fisher includes an improved gerotor pump, indicated generally at 80. The gerotor pump 80 includes an outer element 81 and an inner element 82. The outer element 81 is hollow, having a plurality of teeth 81a (see FIG. 4) formed on the inner surface thereof which mesh with teeth 82a (see FIG. 4) formed on the outer surface of the inner element 82. The inner element 82 is formed having one less tooth than the outer element 81. The teeth on both the outer element 81 and the inner element 82 are formed having conjugately-generated tooth profiles so as to maintain continuous fluid fight contact during operation.

The rearward end (toward the top as shown in FIG. 3) of the outer element 81 includes an integral gear 83 having a plurality of external teeth 83 formed thereon which are adapted to mesh with any rotatably driven gear or shaft contained in the transmission 10 so as to be rotatably driven thereby whenever the transmission 10 is operated. For example, the integral gear teeth 83 on the outer element 81 may mesh with one of the gears located within the auxiliary section of the transmission 10. This rearward end of the outer element 81 also includes an end wall 84 which extends radially inwardly over the rearward end of the inner element 82. The end wall 84 of the outer element 82 is provided with a centrally located through bore 85, the purpose of which is explained below. The forward end (toward the bottom of FIG. 3) of the outer pump element 81 abuts a resilient annular seal 86 which is seated in and extends outwardly from an annular groove formed in the retainer plate 70.

A pilot pin assembly, indicated generally at 90, is provided on which both the outer and inner pump elements 81 and 82 are piloted for rotation. The pilot pin assembly 90 includes a stud 91 having threaded first and second end portions 92 and 93. The first end portion 92 of the stud 91 is received in the threaded portion 66a of the bore 66, thereby threadedly connecting the stud 91 to the interior wall 14b of the housing 14.

The pilot pin assembly 90 further includes a nut 94 having a centrally located threaded bore 95 in which the second end portion 93 of the stud 91 is received to thereby threadedly connect the nut 94 to the stud 91. The nut 94 includes a cylindrical body portion 96 which is received in the bore 85 formed in the end wall 84 of the outer element 81. The nut 94 also has a radially outwardly extending range 97 which, when the nut 94 is connected to the stud 91, abuts the end wall 84 of the outer pump element 81 to force the outer element 81 against the seal 86 and retain both the outer and inner elements 81 and 82 to the interior wall 14b of the housing 14.

The pilot pin assembly 90 also includes a pilot pin, indicated generally at 98, having a cylindrical body portion 99 and a reduced diameter cylindrical end portion 100. A through bore 10 is provided in the pilot pin 98 which is parallel to, but radially offset from, the longitudinal axis of the pilot pin 98. The pilot pin 98 is installed so that the stud 91 is received in the offset bore 101 and the reduced diameter end portion 100 is received within the enlarged portion 66b of the bore 66 formed in the interior wall 14b. The body portion 99 of the pilot pin 98 is received within the inner pump element 82. Thus, the interior element 82 is piloted by the pilot pin 98 for rotation about the stud 91. The forward end of the body portion 99 abuts the retainer plate 70, while the rearward end of the body portion 99 abuts the end wall 84 of the outer pump element 81. As a result, the length of the body portion 99 of the pilot pin 98 determines the amount of clearance which exists between the outer element 81 and retainer plate 70.

The lubricant distribution system further includes a hollow lubricant intake tube, best seen in FIG. 2 and indicated generally at 110. The intake tube 110 has an outlet end 111 and an inlet end 112. The intake tube 110 is preferably formed from a resilient plastic material, such as glass filled nylon. The outlet end 111 of the intake tube 100 is preferably formed having a plurality of resilient fingers (not shown) which are received within the first circular opening 72 of the retainer plate 70 in a snap fit type connection. An O-ring or similar seal (not shown) may be provided about the resilient fingers of the outlet end 111 to provide a fluid fight connection between the intake tube 110 and the retainer plate 70. The inlet end 112 of the intake tube 110 extends downwardly into a lubricant sump 14c (see FIG. 2) defined in the lower portion of the transmission housing 14. The inlet end 112 of the intake robe 110 is preferably covered with a screen (not shown) to prevent debris in the sump 14c from being drawn into the pump 80.

The lubricant distribution system further includes a lubricant discharge tube, indicated generally at 120. As best shown in FIG. 1, the lubricant discharge tube 120 includes first and second hollow discharge legs 121 and 122 which are connected together by a hollow intermediate body 123. The first leg 121 is inserted through and supported snugly within the axially extending bore 65 formed through the interior wall 14b to support the lubricant discharge robe 120 within the transmission housing 14.

When the lubricant discharge robe 120 is installed as described above, the interior portions of the lubricant discharge robe 120 are in fluid communication with the internal passageway 64. A plurality of discharge apertures 127 are formed through the bottom and side portions of the first leg 121 of the lubricant discharge robe 120. The apertures 127 communicate with the hollow interior of the first leg 121 and are positioned to spray lubricant onto the various gears and beatings located within the main section of the transmission 10. A discharge aperture 130 is formed in the intermediate body 123 and communicates with the hollow interior thereof. The discharge aperture 130 is positioned to spray lubricant onto the various gears and beatings located within the auxiliary section of the transmission 10. The hollow interior of the intermediate body 123 also communicates with the hollow interior of the second leg 122 of the lubricant discharge robe 120. A discharge slot 132 is formed through the second leg 122 of the lubricant discharge robe 120. The slot 132 communicates with the hollow interior of the second leg 122 and is also positioned to spray lubricant onto the various gears and bearings located within the auxiliary section of the transmission 10.

When the transmission 10 is operated, the integral gear teeth 83 of the outer pump element 81 cooperate with the associated driven gear contained within the transmission 10, as discussed above. Thus, the outer pump element 81 is rotated about the stud 91 and ranged nut 94. As a result, the inner pump element 92 is caused to rotate about the pilot pin 98 and stud 91. Because of the engagement of their associated teeth, the rotational movement of the inner pump element 82 and the outer pump element 81 draws lubricant inwardly from the sump 14c defined in the lower portion of the transmission housing 14 through the intake tube 110 and the opening 72 formed through the retainer plate 70 into the first channel 61 formed in the interior wall 14b. The lubricant is then drawn through the channel 61 and through the pump inlet 73 formed through the retainer plate 70 into the pump 80. From the pump 80, the lubricant is pumped through the pump outlet 74 formed through the retainer plate 70 and into the second channel 62. As discussed above, the lubricant normally flows through the second channel 62 to the port 62a. However, if the pressure of the lubricant within the second channel 62 is high enough to open the pressure relief valve 69, then the lubricant would flow directly from the second passageway 62 through the bypass channel 68 and into the third channel 63, bypassing the ports 62a and 63a.

Assuming that the pressure relief valve 69 remains closed, the lubricant passes outwardly of the transmission housing 14 through the port 62a, through the fluid conduit to the filter and/or the heat exchanger, and back through the fluid conduit to the port 63a. The lubricant passes from the port 63a to the third channel 63 and up the internal passageway 64 to the axially extending bore 65 formed in the interior wall 14b of the transmission housing 14. As discussed above, the internal passageway 64 communicates with the hollow interior of the lubricant discharge tube 120. Thus, the lubricant is forced through the first leg 121 and is sprayed out of the apertures 127 onto the regions where the main section gears mesh. The lubricant is also forced through the intermediate body 123 and is sprayed out of the aperture 130 onto the meshing gears in the auxiliary section of the transmission 10. From the intermediate body 123, the lubricant is also forced through the second leg 122 and is sprayed out of the discharge slot 132 onto the meshing gears in the auxiliary section of the transmission 10. The sprayed lubricant falls from the meshing gears under the influence of gravity and is collected in the sump 14c defined in the lower portion of the transmission housing 14. As discussed above, the lubricant is initially drawn from this sump 14c defined in the lower portion of the transmission housing 14. Thus, it can be seen that a continuous path is established for continuously circulating the lubricant throughout the transmission 10 during use.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A gerotor pump comprising:
   a hollow outer pump element including an inner surface having a plurality of teeth formed thereon, said outer pump element including an end wall formed integrally with said outer pump element at one end thereof which extends radially inwardly; and
   an inner pump element disposed within said outer pump element and including an outer surface having a plurality of teeth formed thereon which mesh with said teeth formed on said inner surface of said outer pump element.

2. The gerotor pump defined in claim 1 wherein said end wall of said outer pump element has an opening formed therethrough, and wherein said inner pump element is hollow.

3. The gerotor pump defined in claim 2 further including a pilot pin assembly which extends through said opening formed through said end wall of said outer pump element and through said inner pump element to pilot said inner and said outer pump elements for rotation.

4. The gerotor pump defined in claim 3 further including a mounting base having an inlet port and an outlet port formed therein, said pilot pin assembly being secured to said mounting base such that said teeth of said inner and outer pump elements are aligned with said inlet and outlet ports.

5. The gerotor pump defined in claim 3 wherein said pilot pin assembly includes a first member having a cylindrical portion which is received within said inner pump element and which has a bore formed therethrough which extends parallel to, but radially offset from, a longitudinal axis defined by said cylindrical portion.

6. The gerotor pump defined in claim 5 wherein said pilot pin assembly further includes a second member having a cylindrical portion which is received within said opening formed through said end wall of said outer pump element.

7. The gerotor pump defined in claim 6 wherein said second member has bore formed therethrough, and wherein a stud extends through said bores formed through said first and second members to secure said first and second members to said mounting base.

8. The gerotor pump defined in claim 1 wherein said outer pump element includes a gear having a plurality of teeth formed thereon adapted to mesh with a rotatably driven gear or shaft.

9. A transmission comprising:
   a housing defining a sump;
   an input shaft extending within said housing;
   an output shaft extending within said housing;
   a plurality of gears contained within said housing and selectively connectable between said input shaft and said output shaft for providing a plurality of gear ratios therebetween;
   a gerotor pump disposed within said housing, said gerotor pump including a hollow outer pump element including an inner surface having a plurality of teeth formed thereon, said outer element including an end wall formed integrally with said outer element at one end thereof which extends radially inwardly and an inner pump element disposed within said outer pump element, said inner pump element including an outer surface having a plurality of teeth formed thereon which mesh with said teeth formed on said inner surface of said outer element;
   a first fluid conduit providing fluid communication between said sump and said pump;
   a lubricant discharge member supported within said housing, said lubricant discharge member having at least one aperture formed therein; and
   a second fluid conduit providing fluid communication between said pump and said lubricant discharge member.

10. The transmission defined in claim 9 wherein said end wall of said outer pump element has an opening formed therethrough, and wherein said inner pump element is hollow.

11. The transmission defined in claim 10 further including a pilot pin assembly which extends through said opening formed through said end wall of said outer pump element and through said inner pump element to pilot said inner and said outer pump elements for rotation.

12. The transmission defined in claim 11 further including a mounting base having an inlet port and an outlet port formed therein, said pilot pin assembly being secured to said mounting base so that said teeth of said inner and outer pump elements are aligned with said inlet and outlet ports.

13. The transmission defined in claim 11 wherein said pilot pin assembly includes a first member having a cylindrical portion which is received within said inner pump element and which has a bore formed therethrough which extends parallel to, but radially offset from, a longitudinal axis defined by said cylindrical portion.

14. The transmission defined in claim 13 wherein said pilot pin assembly further includes a second member having a cylindrical portion which is received within said opening formed through said end wall of said outer pump element.

15. The transmission defined in claim 14 wherein said second member has bore formed therethrough, and wherein a stud extends through said bores formed through said first and second members to secure said first and second members to said mounting base.

16. The transmission defined in claim 9 wherein said outer pump element includes a gear having a plurality of teeth formed thereon adapted to mesh with a rotatably driven gear or shaft.

17. A gerotor pump comprising:
   a mounting base having an inlet port and an outlet port formed therein;
   a hollow outer pump element including an inner surface having a plurality of teeth formed thereon, said outer element including an end wall provided at one end thereof which extends radially inwardly, said end wall having an opening formed therethrough;

a hollow inner pump disposed within said outer element and including an outer surface having a plurality of teeth formed thereon which mesh with said teeth formed on said inner surface of said outer element; and a pilot pin assembly extending through said opening formed through said end wall of said outer pump element and said hollow inner pump element to pilot said inner and said outer pump elements for rotation, said pilot pin assembly being secured to said mounting base such that said teeth of said inner and said outer elements are aligned with said inlet and outlet ports, said pilot pin assembly including a first member having a cylindrical portion which is received within said inner pump element and having a bore formed therethrough which extends parallel to, but radially offset from, a longitudinal axis defined by said cylindrical portion, a second member having a cylindrical portion which is received within said opening of said end wall of said outer pump element and having a bore, and a stud secured to said mounting base, said stud extending through said bores formed through said first and second members of said pilot pin assembly.

18. The gerotor pump defined in claim 17 wherein said end wall is formed integrally with said outer pump element at one end thereof.

19. The gerotor pump defined in claim 17 wherein said outer pump element includes a gear having a plurality of teeth formed thereon adapted to mesh with a rotatably driven gear or shaft.

20. A transmission comprising:

a housing defining a sump;

an input shaft extending within said housing;

an output shaft extending within said housing;

a plurality of gears contained within said housing and selectively connectable between said input shaft and said output shaft for providing a plurality of gear ratios therebetween;

a gerotor pump disposed within said housing, said gerotor pump including a mounting base having an inlet port and an outlet port formed therein; a hollow outer pump element including an inner surface having a plurality of teeth formed thereon, said outer element including an end wall provided at one end thereof which extends radially inwardly, said end wall having an opening formed therethrough; a hollow inner pump disposed within said outer element and including an outer surface having a plurality of teeth formed thereon which mesh with said teeth formed on said inner surface of said outer element; and a pilot pin assembly received within said opening of said end wall of said outer pump element and within said inner pump element to pilot both said inner and said outer pump elements for rotation, said pilot pin assembly being secured to said mounting base such that said meshing teeth of said inner and said outer elements are aligned with said inlet and outlet ports, said pilot pin assembly including a first member having a cylindrical portion which is received within said inner element and having a bore formed therethrough which is parallel to, but radially offset from, a longitudinal axis defined by said cylindrical portion, a second member having a cylindrical portion which is received within said opening of said end wall of said outer pump element and having a bore, and a stud secured to said mounting base, said stud being received in said bores formed through said first and second members of said pilot pin assembly;

a first fluid conduit providing fluid communication between said sump and said pump;

a lubricant discharge member supported within said housing, said lubricant discharge member having at least one aperture formed therein; and a second fluid conduit providing fluid communication between said pump and said lubricant discharge member.

21. The gerotor pump defined in claim 20 wherein said end wall is formed integrally with said outer pump element at one end thereof.

22. The gerotor pump defined in claim 20 wherein said outer pump element includes a gear having a plurality of teeth formed thereon adapted to mesh with a rotatably driven gear or shaft.

* * * * *